(12) United States Patent
Diamond et al.

(10) Patent No.: US 12,179,727 B2
(45) Date of Patent: Dec. 31, 2024

(54) VEHICLE BRAKE CONTROL

(71) Applicant: Ford Global Technologies, LLC, Dearborn, MI (US)

(72) Inventors: Brendan Francis Diamond, Grosse Pointe, MI (US); Stuart C. Salter, White Lake, MI (US); Kenneth McHugh, Canton, MI (US); Keith Weston, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 315 days.

(21) Appl. No.: 18/047,042

(22) Filed: Oct. 17, 2022

(65) Prior Publication Data
US 2024/0123953 A1 Apr. 18, 2024

(51) Int. Cl.
*B60T 7/22* (2006.01)
*B60W 10/188* (2012.01)

(52) U.S. Cl.
CPC .............. *B60T 7/22* (2013.01); *B60W 10/188* (2013.01); *B60W 2520/04* (2013.01); *B60W 2554/402* (2020.02); *B60W 2710/18* (2013.01)

(58) Field of Classification Search
CPC ................ B60T 7/22; B60T 2201/024; B60T 2210/32; B60Q 9/00; B60W 10/04; B60W 10/188; B60W 30/085; B60W 2520/04; B60W 2554/402; B60W 2554/4029; B60W 2710/18; B60W 30/06; B60W 10/18
See application file for complete search history.

(56) References Cited

U.S. PATENT DOCUMENTS

| | | | | |
|---|---|---|---|---|
| 3,802,727 A | * | 4/1974 | Beckley | B60R 19/18 293/120 |
| 3,895,698 A | * | 7/1975 | Fontaine | B60T 11/103 477/196 |
| 4,572,319 A | * | 2/1986 | Fontaine | B60T 7/12 188/170 |
| 4,793,449 A | * | 12/1988 | Smith | B60T 17/083 303/2 |

(Continued)

FOREIGN PATENT DOCUMENTS

| | | | | |
|---|---|---|---|---|
| CN | 108340914 B | * | 1/2022 | ............. B60Q 9/002 |
| CN | 115071697 B | * | 6/2024 | ............ B60W 30/09 |

(Continued)

OTHER PUBLICATIONS

"Investigation of pedestrian collision avoidance with auto brake;" Avinash et al., 2017 Recent Developments in Control, Automation & Power Engineering (RDCAPE) (2017, pp. 477-481); Oct. 1, 2017. (Year: 2017).*

(Continued)

*Primary Examiner* — Khoi H Tran
*Assistant Examiner* — Jorge O Peche
(74) *Attorney, Agent, or Firm* — Frank Lollo; Bejin Bieneman PLC (57) ABSTRACT

A system for braking a host vehicle. A memory storing instructions executable by a processor includes instructions to actuate friction brakes in the host vehicle when a brake condition occurs. The brake condition includes that the host vehicle is parked on a roadway, a person is located exterior to the host vehicle, and an approaching vehicle will come within a distance threshold of the host vehicle.

20 Claims, 4 Drawing Sheets

(56) References Cited

U.S. PATENT DOCUMENTS

| | | | |
|---|---|---|---|
| 5,164,701 A * | 11/1992 | Nan-Mu | B60Q 1/444 340/467 |
| 5,184,857 A * | 2/1993 | Hawkins | B60R 13/04 293/128 |
| 5,320,392 A * | 6/1994 | Hart | B60R 13/04 293/120 |
| 5,529,138 A * | 6/1996 | Shaw | G01S 17/931 188/DIG. 1 |
| 5,530,420 A * | 6/1996 | Tsuchiya | G06T 7/593 348/42 |
| 5,574,425 A * | 11/1996 | Shu | B60R 25/10 340/426.12 |
| 5,893,366 A * | 4/1999 | Odell | A61F 5/3715 128/869 |
| 6,084,508 A * | 7/2000 | Mai | B60T 7/22 340/436 |
| 6,189,644 B1 * | 2/2001 | Taylor | B60T 17/16 303/6.1 |
| 6,202,664 B1 * | 3/2001 | Shenton, Jr. | E04H 15/06 135/90 |
| 6,226,389 B1 * | 5/2001 | Lemelson | G01S 13/867 382/104 |
| 6,353,383 B1 * | 3/2002 | Gross | B60R 25/1004 340/425.5 |
| 6,642,839 B1 * | 11/2003 | Gunderson | G01S 13/931 340/904 |
| 7,121,191 B1 * | 10/2006 | Fisher | B60T 17/083 92/63 |
| 8,504,268 B2 | 8/2013 | Baier-Welt et al. | |
| 9,045,014 B1 * | 6/2015 | Verhoff | F41H 7/044 |
| 9,224,297 B2 * | 12/2015 | Shaffer | G08G 1/14 |
| 9,415,736 B2 * | 8/2016 | Lind | B60R 21/0134 |
| 10,059,335 B2 * | 8/2018 | Newman | G08G 1/16 |
| 10,214,146 B1 * | 2/2019 | Martinez Romero | G08G 1/166 |
| 11,318,801 B1 * | 5/2022 | McCurter | B60D 1/62 |
| 12,060,053 B1 * | 8/2024 | Smith | B60W 20/17 |
| 2002/0003571 A1 * | 1/2002 | Schofield | B60R 1/04 348/148 |
| 2005/0040983 A1 * | 2/2005 | Madau | B60T 7/22 342/107 |
| 2006/0085131 A1 * | 4/2006 | Yopp | B60W 30/095 701/469 |
| 2006/0287826 A1 * | 12/2006 | Shimizu | B60R 1/28 701/431 |
| 2007/0063874 A1 * | 3/2007 | Danz | G08G 1/166 340/932.2 |
| 2007/0068746 A1 * | 3/2007 | Chittka | F16D 65/18 188/72.6 |
| 2007/0091625 A1 * | 4/2007 | Kim | B60R 1/12 362/494 |
| 2007/0142977 A1 * | 6/2007 | Munoz | B60Q 5/00 701/1 |
| 2007/0294014 A1 * | 12/2007 | Green | B66C 23/78 701/1 |
| 2008/0089556 A1 * | 4/2008 | Salgian | G06T 7/285 382/103 |
| 2008/0310737 A1 * | 12/2008 | Han | G06F 18/254 382/224 |
| 2010/0308630 A1 * | 12/2010 | Davis | B60N 2/882 297/391 |
| 2011/0046815 A1 * | 2/2011 | Kindt | F02D 11/02 701/2 |
| 2011/0074957 A1 * | 3/2011 | Kiyohara | G06V 10/267 348/148 |
| 2011/0146621 A1 * | 6/2011 | Weisz | B60W 30/18054 290/51 |
| 2011/0295470 A1 * | 12/2011 | Burchett | B62D 53/0814 701/49 |
| 2012/0203435 A1 | 8/2012 | Braennstroem et al. | |
| 2013/0134002 A1 * | 5/2013 | Schmandt | F16D 51/48 188/70 R |
| 2013/0273864 A1 * | 10/2013 | Helm | H04H 60/72 455/150.1 |
| 2014/0145861 A1 * | 5/2014 | Goudy | G08G 1/163 340/905 |
| 2014/0148998 A1 * | 5/2014 | Goudy | G08G 1/163 340/436 |
| 2014/0149031 A1 * | 5/2014 | Goudy | G08G 1/161 701/300 |
| 2014/0152679 A1 * | 6/2014 | Raita | G06F 11/0739 345/522 |
| 2015/0158470 A1 * | 6/2015 | Choi | B60Q 1/48 701/2 |
| 2015/0254977 A1 * | 9/2015 | Grabow | G08G 1/161 340/903 |
| 2015/0344028 A1 * | 12/2015 | Gieseke | B60W 30/095 348/148 |
| 2016/0163199 A1 * | 6/2016 | Chundrlik, Jr. | G08G 1/166 701/70 |
| 2017/0028900 A1 * | 2/2017 | Stocks | B62D 63/025 |
| 2017/0043753 A1 * | 2/2017 | Johnson | B60T 7/22 |
| 2017/0078653 A1 * | 3/2017 | Bi | B60R 1/31 |
| 2017/0120912 A1 * | 5/2017 | Ishioka | B60W 30/16 |
| 2017/0162047 A1 * | 6/2017 | Garcia Lopez | G08G 1/16 |
| 2017/0240186 A1 * | 8/2017 | Hatano | B60W 50/087 |
| 2017/0282915 A1 * | 10/2017 | Kim | B60W 30/08 |
| 2017/0308075 A1 * | 10/2017 | Whitaker | B62D 15/027 |
| 2017/0361807 A1 * | 12/2017 | Dellock | B60R 25/1012 |
| 2017/0369016 A1 * | 12/2017 | Gurghian | B60W 30/0956 |
| 2018/0141551 A1 * | 5/2018 | Sugano | B60W 50/08 |
| 2018/0147980 A1 * | 5/2018 | Blask | B60Q 1/543 |
| 2018/0162388 A1 * | 6/2018 | You | G06V 20/58 |
| 2018/0201265 A1 * | 7/2018 | Megyesi | B60W 10/11 |
| 2018/0238696 A1 * | 8/2018 | Takeda | G08G 1/16 |
| 2018/0281819 A1 * | 10/2018 | Akaba | G06F 3/167 |
| 2018/0304869 A1 * | 10/2018 | Hernandez | B60T 7/042 |
| 2018/0346028 A1 * | 12/2018 | Chang | B60W 10/04 |
| 2019/0019412 A1 * | 1/2019 | Roca | G08G 1/168 |
| 2019/0071071 A1 * | 3/2019 | Yamada | B60W 50/0097 |
| 2019/0073540 A1 * | 3/2019 | Yamada | G01S 7/24 |
| 2019/0092320 A1 * | 3/2019 | Nagata | B60W 30/09 |
| 2019/0135246 A1 * | 5/2019 | Jeong | B60T 8/171 |
| 2019/0256086 A1 * | 8/2019 | Ohmura | B60T 7/12 |
| 2019/0263239 A1 * | 8/2019 | Chen | B60J 11/04 |
| 2019/0366988 A1 * | 12/2019 | Goodman | B60R 25/102 |
| 2019/0371182 A1 * | 12/2019 | England | G08G 1/0112 |
| 2020/0001810 A1 * | 1/2020 | Baehrle-Miller | B60R 21/0132 |
| 2020/0050212 A1 * | 2/2020 | Mimura | B60W 30/0956 |
| 2020/0117191 A1 * | 4/2020 | Ito | B60W 30/09 |
| 2020/0339196 A1 * | 10/2020 | Jang | B60W 60/0025 |
| 2020/0365019 A1 * | 11/2020 | Noguchi | G08G 1/146 |
| 2021/0039666 A1 * | 2/2021 | Jeong | B62D 15/027 |
| 2021/0061261 A1 * | 3/2021 | Wodrich | B60W 30/06 |
| 2021/0061265 A1 * | 3/2021 | Furtado | B60R 21/0132 |
| 2021/0129807 A1 * | 5/2021 | DeVault | B62D 25/082 |
| 2021/0139020 A1 * | 5/2021 | Ikezawa | B60W 30/16 |
| 2021/0179057 A1 * | 6/2021 | Shingai | B60T 7/22 |
| 2021/0179174 A1 * | 6/2021 | Shingai | B60T 17/221 |
| 2021/0239172 A1 * | 8/2021 | Bradford | G01S 15/88 |
| 2022/0169240 A1 * | 6/2022 | Ishinoda | B60Q 9/008 |
| 2022/0196422 A1 * | 6/2022 | Ishinoda | G01C 21/3807 |
| 2022/0258731 A1 * | 8/2022 | Kuno | B60W 50/14 |
| 2022/0396270 A1 * | 12/2022 | Koh | B60W 10/06 |
| 2023/0041429 A1 * | 2/2023 | Sanchez | B60W 60/0013 |
| 2023/0134693 A1 * | 5/2023 | Kim | B60W 20/13 701/22 |
| 2023/0294597 A1 * | 9/2023 | Okamura | B60Q 1/507 701/23 |
| 2023/0365127 A1 * | 11/2023 | Hu | B60W 30/095 |
| 2024/0001950 A1 * | 1/2024 | Ravuri | B60W 10/18 |
| 2024/0051504 A1 * | 2/2024 | Jeong | G06V 20/588 |
| 2024/0092323 A1 * | 3/2024 | Reifman | B60T 7/12 |
| 2024/0109558 A1 * | 4/2024 | Goradia | B60W 50/029 |
| 2024/0123953 A1 * | 4/2024 | Diamond | B60T 7/22 |
| 2024/0132027 A1 * | 4/2024 | McKendrick | B60T 13/745 |
| 2024/0132057 A1 * | 4/2024 | Inoue | B62D 15/0285 |
| 2024/0140344 A1 * | 5/2024 | Bartlett | B60R 21/01542 |

(56) References Cited

U.S. PATENT DOCUMENTS

| | | | |
|---|---|---|---|
| 2024/0159287 A1* | 5/2024 | Dang | F16D 66/027 |
| 2024/0286604 A1* | 8/2024 | Yeom | B60W 50/14 |
| 2024/0317266 A1* | 9/2024 | Kan | B60W 60/0053 |

FOREIGN PATENT DOCUMENTS

| | | | | |
|---|---|---|---|---|
| DE | 19703517 A1 | * | 8/1998 | B62D 15/0285 |
| DE | 19752924 A1 | * | 2/1999 | B62B 3/1404 |
| DE | 102015215427 A1 | | 2/2017 | |
| JP | 2507327 Y2 | * | 8/1996 | |
| JP | 2011194979 A | * | 10/2011 | |
| KR | 20120129062 A | * | 11/2012 | |
| KR | 20170027635 A | * | 3/2017 | |
| KR | 20190091366 A | * | 8/2019 | |
| KR | 102093670 B1 | * | 3/2020 | |
| KR | 20230027342 A | * | 2/2023 | |
| WO | WO-0161377 A2 | * | 8/2001 | G01S 13/862 |

OTHER PUBLICATIONS

"RC-sized Autonomous vehicle with Prediction Model;" Bheda et al., 2022 IEEE 7th International conference for Convergence in Technology (I2CT) (2022, pp. 1-7); Apr. 7, 2022. (Year: 2022).*

"Intelligent Parking System for Car Parking Guidance and Damage Notification;" Alfatihi et al., 2013 4th International Conference on Intelligent Systems, Modelling and Simulation (2013, pp. 24-29); Apr. 10, 2019. (Year: 2013).*

"A Review on Driving Control Issues for Smart Electric Vehicles;" Haque et al., IEEE Access (vol. 9, 2021, pp. 135440-135472); Jan. 1, 2021 (Year: 2021).*

* cited by examiner

VEHICLE BRAKE CONTROL

BACKGROUND

Modern vehicles can include various types of brakes, including parking brakes and friction brakes. Parking brakes are typically used retain a stopped vehicle. Parking brakes typically operate on rear wheels by means of a cable. Friction brakes, on the other hand, are typically used to stop a moving vehicle. Friction brakes are typically hydraulically powered and may operate all four wheels. Friction brakes are typically capable of applying more powerful braking forces on the vehicle wheels than parking brakes.

DETAILED DESCRIPTION

The present description disclosed systems and methods for applying friction brakes to a parked vehicle. Sensors on the parked vehicle are used determine that the vehicle is parked on a roadway and to predict if an approaching vehicle will come near the parked vehicle. When such brake conditions occur, the parked vehicle's friction brakes are activated to provide greater braking forces on the vehicle wheels than parking brakes.

Throughout the description reference is made to FIGS. 1-3B. When referring to the Figures, like structures and elements shown throughout are indicated with like reference numerals.

Described herein are systems and methods to control braking of a parked vehicle. In one exemplary configuration, a system for braking a host vehicle includes a processor and a memory, with the memory storing instructions executable by the processor. The instructions include instructions to determine that the host vehicle is parked on a roadway, determine that a person is located exterior to the host vehicle based on first sensor data, predict that an approaching vehicle will come within a distance threshold of the host vehicle based on second sensor data, and actuate friction brakes in the host vehicle when a brake condition occurs. The brake condition includes that the host vehicle is parked on the roadway, the person is located exterior to the host vehicle, and the approaching vehicle will come within the distance threshold of the host vehicle.

The instructions may further include instructions to activate a brake booster coupled to the friction brakes in the host vehicle when the brake condition occurs. The instructions may include instructions to deactivate the brake booster when the brake condition no longer occurs.

In one arrangement, the instructions further include instructions to determine that the person is proximate a front portion of the host vehicle, and the brake condition includes that the person is proximate the front portion of the host vehicle. In another arrangement, the instructions further include instructions to determine that a user of the host vehicle is located exterior to the host vehicle, and the brake condition includes that the user is located exterior to host vehicle.

The system may include instructions to determine if a front portion of the host vehicle is facing a parked vehicle, and to actuate the host vehicle such that the front portion of the host vehicle is not facing the parked vehicle. The system may include instructions to determine a distance between the host vehicle and the parked vehicle based on third sensor data, and to move the host vehicle away from the parked vehicle if the distance between the host vehicle and the parked vehicle is below a threshold separation distance. The system may include instructions to determine a distance between the host vehicle and the parked vehicle based on third sensor data, and to message a driver of the host vehicle if the distance between the host vehicle and the parked vehicle is below a threshold separation distance.

In one configuration, the system may include instructions to apply a negative torque to the wheels of the host vehicle upon detecting an impact by the approaching vehicle with the host vehicle.

Another exemplary configuration includes a method for braking a host vehicle. The method includes determining that the host vehicle is parked on a roadway, determining that a person is located exterior to the host vehicle based on first sensor data, and predicting that an approaching vehicle will come within a distance threshold of the host vehicle based on second sensor data. Upon occurrence of a brake condition, friction brakes in the host vehicle are actuated. The brake condition includes that the host vehicle is parked on the roadway, the person is located exterior to the host vehicle, and the approaching vehicle will come within the distance threshold of the host vehicle.

The method may include activating a brake booster coupled to the friction brakes in the host vehicle when the brake condition occurs and deactivating the brake booster when the brake condition no longer occurs.

The method may include determining that the person is proximate a front portion of the host vehicle, the brake condition includes that the person is proximate the front portion of the host vehicle. The method may include determining that a user of the host vehicle is located exterior to the host vehicle, and the brake condition includes that the user is located exterior to host vehicle.

The method may include determining that a front portion of the host vehicle is facing a parked vehicle and actuating the host vehicle such that the front portion of the host vehicle is not facing the parked vehicle. The method may include determining a distance between the host vehicle and the parked vehicle based on third sensor data and moving the host vehicle away from the parked vehicle when the distance between the host vehicle and the parked vehicle is below a threshold separation distance. In one arrangement, the method may include determining a distance between the host vehicle and the parked vehicle based on third sensor data and messaging a driver of the host vehicle when the distance between the host vehicle and the parked vehicle is below a threshold separation distance.

In another configuration, the method may further include applying a negative torque to the wheels of the host vehicle upon detecting an impact by the approaching vehicle with the host vehicle.

Another implementation may include a computer program product for braking a host vehicle. The computer program product includes a non-transitory computer readable storage medium having computer readable program code embodied therewith. The computer readable program code is configured to determine that the host vehicle is parked on a roadway, determine that a person is located exterior to the host vehicle based on first sensor data, predict that an approaching vehicle will come within a distance threshold of the host vehicle based on second sensor data, and actuate friction brakes in the host vehicle when a brake condition occurs. The brake condition includes that the host vehicle is parked on the roadway, the person is located exterior to the host vehicle, and the approaching vehicle will come within the distance threshold of the host vehicle. The computer readable program code may be further configured to activate a brake booster coupled to the friction brakes in the host vehicle when the brake condition occurs.

Figure 1:
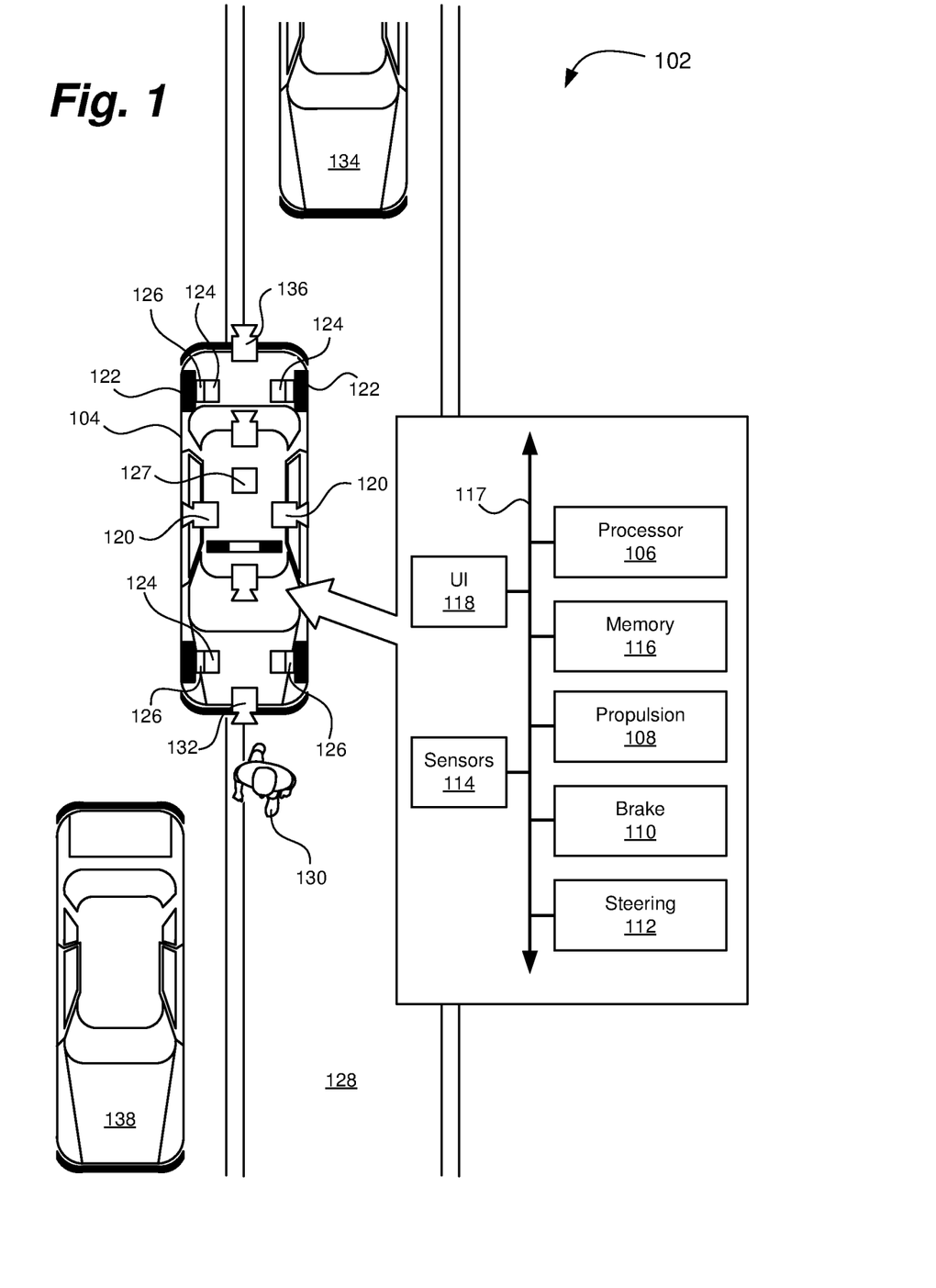
FIG. 1 shows an example system for actuating brakes in a vehicle.

FIG. 1 shows an example system 102 for actuating brakes in a host vehicle 104. The host vehicle 104 may be any passenger or commercial automobile such as a car, a truck, a sport utility vehicle, a crossover, a van, a minivan, a taxi, a bus, etc.

The host vehicle 104 may be an autonomous vehicle. A computer processor 106 can be programmed to operate the host vehicle 104 independently of the intervention of a human operator, completely or to a lesser degree. The computer processor 106 may be programmed to operate a propulsion system 108, a brake system 110, a steering system 112, and/or other vehicle systems based on data received from sensors 114. For the purposes of this disclosure, autonomous operation means the computer processor 106 controls the propulsion system 108, brake system 110, and steering system 112 without input from a human operator. Semi-autonomous operation means the computer processor 106 controls one or two of the propulsion system 108, brake system 110, and steering system 112 and a human operator controls the remainder. Nonautonomous operation means a human operator controls the propulsion system 108, brake system 110, and steering system 112.

The computer processor 106 is a microprocessor-based computing device, e.g., a generic computing device including an electronic controller or the like, a field-programmable gate array (FPGA), an application-specific integrated circuit (ASIC), a combination of the foregoing, etc. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. Memory 116 can include media for storing instructions executable by the computer processor 106 as well as for electronically storing data and/or databases, and/or the computer processor 106 can include structures such as the foregoing by which programming is provided. The computer processor 106 can be multiple computer processors coupled together.

The computer processor 106 may transmit and receive data through a communications network 117 such as a controller area network (CAN) bus, Ethernet, WiFi, Local Interconnect Network (LIN), onboard diagnostics connector (OBD-II), and/or by any other wired or wireless communications network. The computer processor 106 may be communicatively coupled to the sensors 114, the propulsion system 108, the brake system 110, the steering system 112, the memory 116, a user interface 118, and other components via the communications network.

The sensors 114 may provide data about operation of the host vehicle 104, for example, wheel speed, wheel orientation, and engine and transmission data (e.g., temperature, fuel consumption, etc.). The sensors 114 may detect the location and/or orientation of the host vehicle 104. For example, the sensors 114 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 114 may detect the external world, e.g., the objects and/or characteristics of surroundings of the host vehicle 104, such as other vehicles, road lane markings, traffic lights and/or signs, pedestrians, etc. For example, the sensors 114 may include radar sensors, scanning laser range finders, light detection and ranging (LIDAR) devices, and image processing sensors such as cameras 120.

The propulsion system 108 of the host vehicle 104 generates energy and translates the energy into motion of the host vehicle 104. The propulsion system 108 may be a conventional vehicle propulsion subsystem, for example, a conventional powertrain including an internal-combustion engine coupled to a transmission that transfers rotational motion to wheels 122; an electric powertrain including batteries, an electric motor 124, and a transmission that transfers rotational motion to the wheels 122; a hybrid powertrain including elements of the conventional powertrain and the electric powertrain; or any other type of propulsion. The propulsion system 108 can include an electronic control unit (ECU) or the like that is in communication with and receives input from the computer processor 106 and/or a human operator. The human operator may control the propulsion system 108 via, e.g., an accelerator pedal and/or a gear-shift lever.

The brake system 110 is a vehicle braking subsystem and resists the motion of the host vehicle 104 to thereby slow and/or stop the host vehicle 104. The brake system 110 may include friction brakes 126 such as disc brakes, drum brakes, band brakes, etc.; a brake booster 127; regenerative brakes; any other suitable type of brakes; or a combination. The brake system 110 can include an electronic control unit (ECU) or the like that is in communication with and receives input from the computer processor 106 and/or a human operator. The human operator may control the brake system 110 via, e.g., a brake pedal.

The steering system 112 is typically a conventional vehicle steering subsystem and controls the turning of the wheels 122. The steering system 112 may be a rack-and-pinion system with electric power-assisted steering, a steer-by-wire system, as both are known, or any other suitable system. The steering system 112 can include an electronic control unit (ECU) or the like that is in communication with and receives input from the computer processor 106 and/or a human operator. The human operator may control the steering system 112 via, e.g., a steering wheel.

The user interface 118 presents information to and receives information from an occupant of the host vehicle 104. The user interface 118 may be located, e.g., on an instrument panel in a passenger cabin of the host vehicle 104, or wherever may be readily seen by the occupant. The user interface 118 may include dials, digital readouts, screens, speakers, and so on for providing information to the occupant, e.g., human-machine interface (HMI) elements such as are known. The user interface 118 may include buttons, knobs, keypads, microphone, and so on for receiving information from the occupant.

The memory 116 can store instructions executable by the processor 106. These instructions include instructions to determine that the host vehicle is parked on a roadway 128. The sensors 114 can include measuring devices to determine whether the host vehicle 104 is located on a roadway 128.

As used herein, a "roadway" includes any suitable travel surface such as shoulder and service lanes of the roadway.

The instructions may also instruct the processor 106 to determine that a person 130 is located exterior to the host vehicle 104 based on first sensor data. The first sensor data may include, for example, a first image stream from a forward-facing camera 132 carried by the host vehicle 104.

The memory 116 may include instructions to cause the processor 106 to predict that an approaching vehicle 134 will come within a distance threshold of the host vehicle 104 based on second sensor data. The second sensor data may include, for example, a second image stream from the rear-facing camera 136 carried by the host vehicle 104.

The instructions can include instructions to actuate the friction brakes 126 in the host vehicle 104 when a brake condition occurs. As used herein, a brake condition is a set of data that determines whether to actuate or deactivate the host vehicle's friction brakes, such as, for example, a status or location of a pedestrian. The friction brakes are brakes applied to each wheel of the host vehicle 104 under hydraulic pressure. The friction brakes may be disc brakes, drum brakes, and the like.

The brake condition may include that the host vehicle 104 is parked on the roadway 128, the person 130 is located exterior to the host vehicle 104, and the approaching vehicle 134 will come within the distance threshold of the host vehicle 104. The memory 116 may include instructions to apply a negative torque to the wheels 122 of the host vehicle 104 upon detecting an impact by the approaching vehicle 134 with the host vehicle 104.

In one configuration, the instructions further include instructions to determine that the person 130 is proximate a front portion of the host vehicle 104. The brake condition may include that the person 130 is proximate the front portion of the host vehicle 104. In the present context, "proximate" means an area in the field of view of at least one forward-facing sensor carried by the host vehicle 104.

In one arrangement, the instructions include instructions to determine that a user of the host vehicle 104 is located exterior to the host vehicle 104. For example, sensors within the host vehicle 104 may signal to the processor 106 that the driver has exited the host vehicle 104. Furthermore, the brake condition may include a condition that the user is located exterior to host vehicle 104.

The instructions may further include instructions to activate the brake booster 127 in the host vehicle 104 when the brake condition occurs. The instructions may further include instructions to deactivate the brake booster 127 in the host vehicle 104 when the brake condition no longer occurs.

In one configuration, the instructions may cause the processor 106 to determine if a front portion of the host vehicle 104 is facing a parked vehicle 138. The instructions may further actuate the host vehicle 104 such that the front portion of the host vehicle 104 is not facing the parked vehicle 138 (see FIGS. 3A and 3B).

The instructions may cause the processor 106 to determine a distance between the host vehicle 104 and the parked vehicle 138 based on third sensor data. If the distance between the host vehicle and the parked vehicle is below a threshold separation distance, the processor 106 may alert a driver of the host vehicle 104 that the vehicles are too close to each other. The instructions can additionally or alternatively cause the processor 106 to move the host vehicle 104 away from the parked vehicle 138 if the distance between the host vehicle and the parked vehicle is below a threshold separation distance (see FIGS. 3A and 3B).

In one configuration, the sequence of operations described herein may be enabled whenever the host vehicle 104 is parked. The host vehicle 104 may be considered parked when, for example, the transmission shift lever is placed in the "Park" position and/or the parking pawl is engaged, or when transmission shift lever is placed in the "Neutral" position and/or the parking brake is engaged. Alternatively, the sequence of operations may be enabled upon the vehicle user activating a particular parking mode.

Figure 2A:
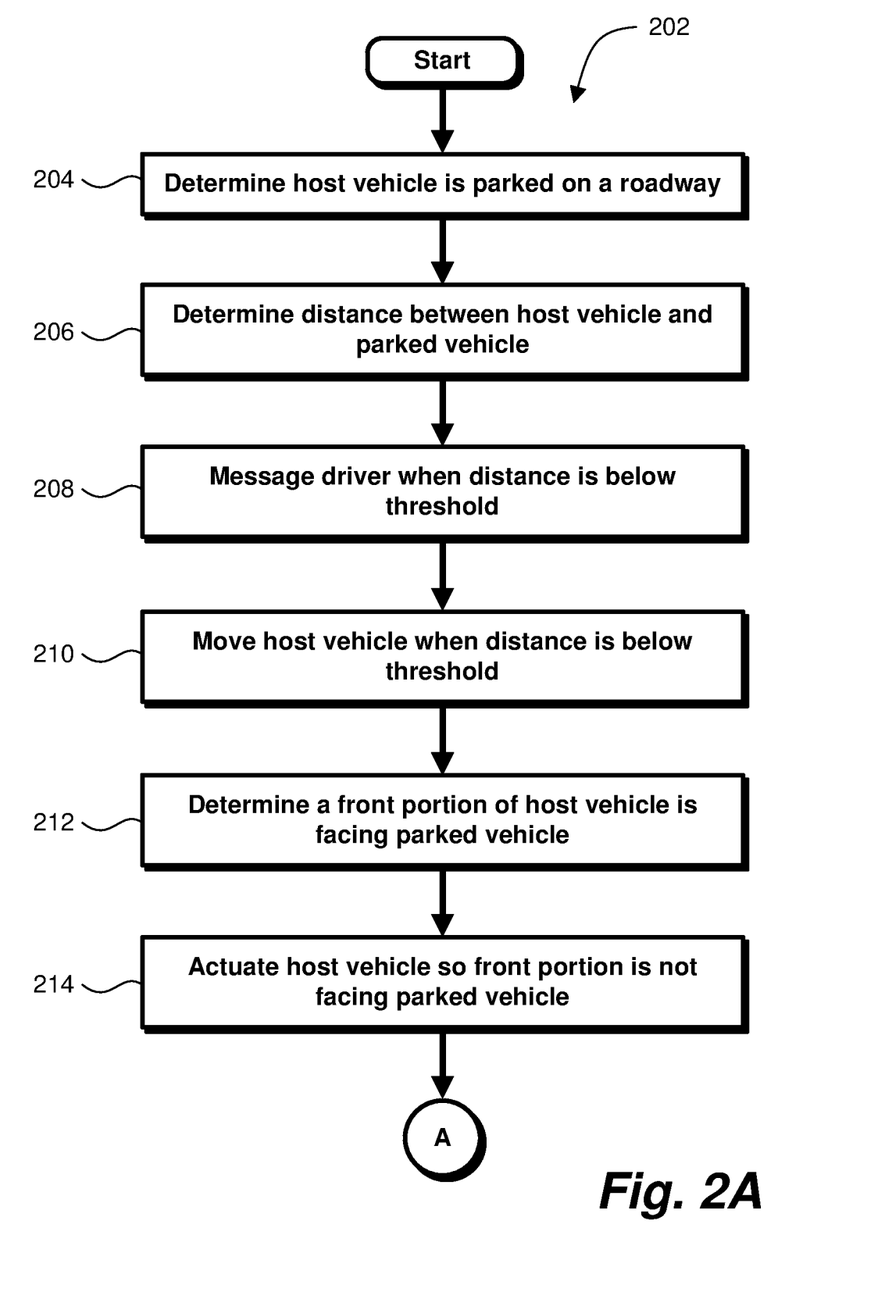
FIGS. 2A and 2B show an example method for actuating brakes in a vehicle.
Figure 2B:
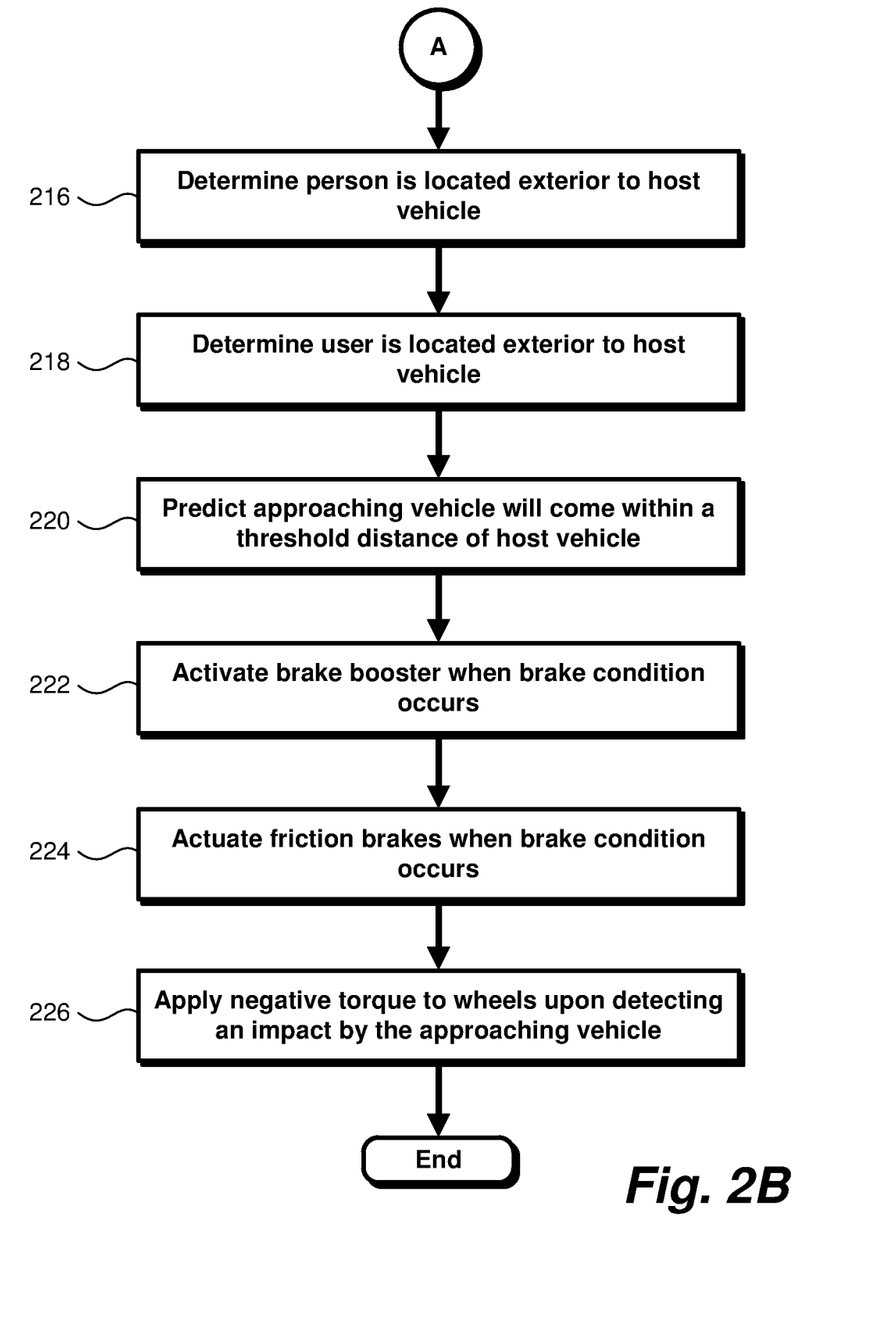

FIGS. 2A and 2B show an example method 202 for braking a host vehicle 104. As mentioned, the memory 116 of the host vehicle 104 may store executable instructions for performing the steps described below.

The method 202 includes determining operation 204 to determine that the host vehicle 104 is parked on a roadway 128 where another vehicle could travel past the host vehicle 104. As discussed above, the host vehicle 104 is equipped with various sensors that can be used to determine that the host vehicle 104 is parked on a roadway 128, including GPS sensors and cameras. After determining operation 204, control passes to determining operation 206.

At determining operation 206, a distance between the host vehicle 104 and a parked vehicle 138 is determined. The distance can be based on sensor data from one or more sensors 114 carried by the host vehicle 104. After determining operation 206, control passes to messaging operation 208.

At messaging operation 208, the driver of the host vehicle 104 is alerted when the distance between the host vehicle 104 and the parked vehicle 138 is below a threshold separation distance. The alert may be presented to the driver through the user interface 118. After messaging operation 208, control passes to moving operation 210.

At moving operation 210, the host vehicle 104 is moved away from the parked vehicle 138 when the distance between the host vehicle and the parked vehicle is below the threshold separation distance. In one embodiment, the threshold separation distance is dependent on the speed limit of the roadway 128. This operation can be performed by an autonomous operation, a semi-autonomous operation, or a nonautonomous operation. After moving operation 210, control passes to determining operation 212.

At determining operation 212, the processor 106 determines if a front portion of the host vehicle 104 is facing the parked vehicle 138. Sensor data from the sensors 114 may be used to establish if the front portion of the host vehicle 104 is facing the parked vehicle 138. After determining operation 212, control passes to actuating operation 214.

At actuating operation 214, the host vehicle 104 is actuated such that the front portion of the host vehicle 104 is not facing the parked vehicle 138. This operation can be performed by an autonomous operation, a semi-autonomous operation, or a nonautonomous operation.

Figure 3A:
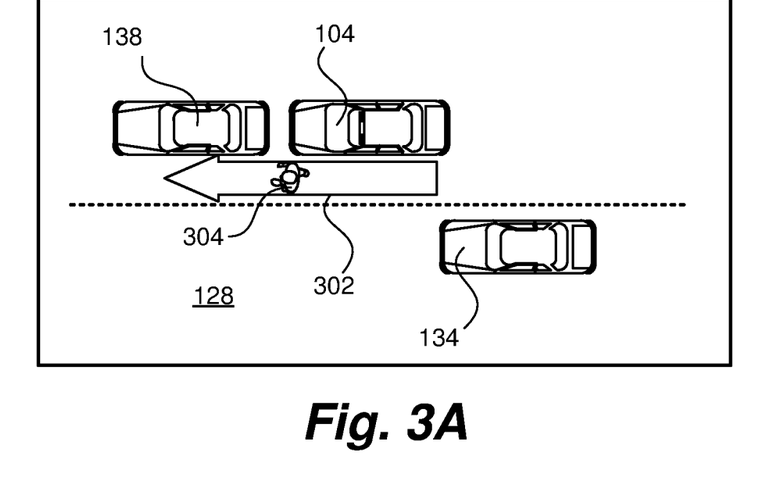
FIGS. 3A and 3B show conditions before and after moving and actuating vehicle operations are performed.

For example, FIG. 3A shows a host vehicle 104, such as an emergency responder, parked next to a parked vehicle 138 on a shoulder of a roadway 128. The distance between the host vehicle 104 and the parked vehicle 138 is below the threshold separation distance and a walking lane 302 for a pedestrian 304 between the host vehicle 104 and the parked vehicle 138 is not blocked off to oncoming traffic by the host vehicle 104.

The host vehicle 104 measures the separation distance between the host vehicle 104 and the parked vehicle 138. Based on the speed limit of the roadway 128, the host vehicle 104 determines if the separation distance is below the threshold separation distance. The host vehicle 104 also determines if the front portion of the host vehicle 104 is facing the parked vehicle 138.

Figure 3B:
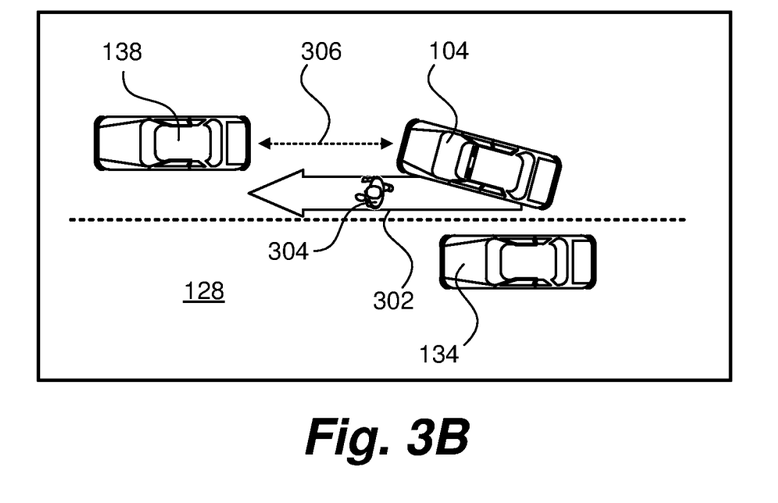

FIG. 3B shows an example result after moving operation 210 and actuating operation 214 are performed. The host vehicle is moved backwards to achieve a separation distance that is equal to or greater than the threshold separation distance 306. This ensures there is more room between the host vehicle 104 and the parked vehicle 138. In addition, the host vehicle 104 is reoriented such that it is not facing the parked vehicle 138. For example, the host vehicle 104 can be angled to face a guard rail. By angling front portion of the host vehicle 104 so it is not facing the parked vehicle 138, the host vehicle 104 acts as "blocker" against approaching vehicles 134 and provides a lane of coverage for the pedestrian 304 to walk from the host vehicle 104 to the parked vehicle 138.

Moving and/or reorienting the host vehicle 104 can take place, for example, by activating a remote park assist button on a key fob. Alternatively, the user interface 118 of the host vehicle 104 can provide instructions to reorient and repark the host vehicle 104.

Returning to FIGS. 2A and 2B, after actuating operation 214, control passes to determining operation 216. At determining operation 216, the processor 106 determines if a person 130 is located exterior to the host vehicle 104 based on sensor data. The host vehicle 104 may, for example, use the vehicle's interior camera and the exterior radar and/or exterior cameras to identify the location of people. A key fob, phone as a key (PAAK), Bluetooth signature, RFID and/or Bluetooth Low Energy (BLE) tag can also be used to identify the location of people around the vehicle. In one configuration, the determining operation 216 includes determining that the person is proximate a front portion of the host vehicle 104. After determining operation 216, control passes to determining operation 218.

At determining operation 218, the processor 106 determines if a user of the host vehicle 104, such as the host vehicle driver, is located exterior to the host vehicle 104. The processor 106 may use interior cameras and other interior sensors to make this determination. After determining operation 218, control passes to predicting operation 220.

At predicting operation 220, the processor 106 predicts if an approaching vehicle 134 will come within a distance threshold of the host vehicle 104 based on sensor data. The host vehicle 104 may use an exterior camera and/or radar to monitor oncoming traffic to determine if and when a vehicle on the roadway will travel past the host vehicle 104. The host vehicle 104 will also determine when the oncoming traffic has driven past the host vehicle 104. After predicting operation 220, control passes to activating operation 222.

At activating operation 222, a brake booster coupled to the friction brakes in the host vehicle 104 is activated when the brake condition occurs. This operation may include charging up an electronic brake booster to create service brake hydraulic pressure and applying the service brakes at full capacity. The activating operation may include deactivating the brake booster when the brake condition no longer exists. After activating operation 222, control passes to actuating operation 224.

At actuating operation 224, friction brakes 126 in the host vehicle 104 are actuated when a brake condition occurs. The brake condition includes that the host vehicle 104 is parked on the roadway 128, the person 130 is located exterior to the host vehicle 104, and the approaching vehicle 134 will come within the distance threshold of the host vehicle 104. In one configuration, the brake condition includes that the person 130 is proximate the front portion of the host vehicle 104. In another arrangement, the brake condition includes that the user is located exterior to host vehicle 104.

By actuating the friction brakes 126, movement of the host vehicle 104 during a collision with an approaching vehicle 134 may be reduced. Actuating the friction brakes 126 may include activating an anti-lock braking system (ABS) at the host vehicle 104. After actuating operation 224, control passes to applying operation 226.

At applying operation 226, a negative torque is applied to the wheels 122 of the host vehicle 104 upon detecting an impact by the approaching vehicle 134 with the host vehicle 104. This operation may further reduce movement of the host vehicle 104 during a collision with an approaching vehicle 134.

The descriptions of the various examples and implementations have been presented for purposes of illustration but are not intended to be exhaustive or limited to the implementations disclosed. Many modifications and variations will be apparent to those of ordinary skill in the art without departing from the scope and spirit of the described implementations. The terminology used herein was chosen to best explain the principles of the implementations, the practical application or technical enhancements over technologies found in the marketplace, or to enable others of ordinary skill in the art to understand the implementations disclosed herein.

As will be appreciated, the methods and systems described may be implemented as a computer program product. The computer program product may include a computer readable storage medium (or media) having computer readable program instructions thereon for causing a processor to carry out operations discussed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some implementations, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry.

Various implementations are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system for braking a host vehicle, the system comprising:
    a processor and a memory, the memory storing instructions executable by the processor, including instructions to:
    determine that the host vehicle is parked on a roadway;
    determine that a person is located exterior to the host vehicle based on first sensor data;
    predict that an approaching vehicle will come within a distance threshold of the host vehicle based on second sensor data; and
    actuate friction brakes in the host vehicle when a brake condition occurs, the brake condition including that the host vehicle is parked on the roadway, the person is located exterior to the host vehicle, and the approaching vehicle will come within the distance threshold of the host vehicle.

2. The system of claim 1, wherein the instructions further include instructions to activate a brake booster coupled to the friction brakes in the host vehicle when the brake condition occurs.

3. The system of claim 2, wherein the instructions further include instructions to deactivate the brake booster when the brake condition no longer occurs.

4. The system of claim 1,
    wherein the instructions further include instructions to determine that the person is proximate a front portion of the host vehicle; and
    wherein the brake condition includes that the person is proximate the front portion of the host vehicle.

5. The system of claim 1,
    wherein the instructions further include instructions to determine that a user of the host vehicle is located exterior to the host vehicle; and wherein the brake condition includes that the user is located exterior to the host vehicle.

6. The system of claim 1, wherein the instructions further include instructions to:
determine if a front portion of the host vehicle is facing a parked vehicle; and
actuate the host vehicle such that the front portion of the host vehicle is not facing the parked vehicle.

7. The system of claim 6, wherein the instructions further include instructions to:
determine a distance between the host vehicle and the parked vehicle based on third sensor data; and
move the host vehicle away from the parked vehicle if the distance between the host vehicle and the parked vehicle is below a threshold separation distance.

8. The system of claim 6, wherein the instructions further include instructions to:
determine a distance between the host vehicle and the parked vehicle based on third sensor data; and
message a driver of the host vehicle if the distance between the host vehicle and the parked vehicle is below a threshold separation distance.

9. The system of claim 1, wherein the instructions further include instructions to apply a negative torque to wheels of the host vehicle upon detecting an impact by the approaching vehicle with the host vehicle.

10. A method for braking a host vehicle, the method comprising:
determining that the host vehicle is parked on a roadway;
determining that a person is located exterior to the host vehicle based on first sensor data; predicting that an approaching vehicle will come within a distance threshold of the host vehicle based on second sensor data; and
actuating friction brakes in the host vehicle when a brake condition occurs, the brake condition including that the host vehicle is parked on the roadway, the person is located exterior to the host vehicle, and the approaching vehicle will come within the distance threshold of the host vehicle.

11. The method of claim 10, further comprising activating a brake booster coupled to the friction brakes in the host vehicle when the brake condition occurs.

12. The method of claim 11, further comprising deactivating the brake booster when the brake condition no longer occurs.

13. The method of claim 10, further comprising:
determining that the person is proximate a front portion of the host vehicle; and
wherein the brake condition includes that the person is proximate the front portion of the host vehicle.

14. The method of claim 10, further comprising:
determining that a user of the host vehicle is located exterior to the host vehicle; and
wherein the brake condition includes that the user is located exterior to the host vehicle.

15. The method of claim 10, further comprising:
determining that a front portion of the host vehicle is facing a parked vehicle; and
actuating the host vehicle such that the front portion of the host vehicle is not facing the parked vehicle.

16. The method of claim 15, further comprising:
determining a distance between the host vehicle and the parked vehicle based on third sensor data; and
moving the host vehicle away from the parked vehicle when the distance between the host vehicle and the parked vehicle is below a threshold separation distance.

17. The method of claim 15, further comprising:
determining a distance between the host vehicle and the parked vehicle based on third sensor data; and
messaging a driver of the host vehicle when the distance between the host vehicle and the parked vehicle is below a threshold separation distance.

18. The method of claim 10, further comprising applying a negative torque to wheels of the host vehicle upon detecting an impact by the approaching vehicle with the host vehicle.

19. A computer program product for braking a host vehicle, the computer program product comprising:
a non-transitory computer readable storage medium having computer readable program code embodied therewith, the computer readable program code configured to:
determine that the host vehicle is parked on a roadway;
determine that a person is located exterior to the host vehicle based on first sensor data; predict that an approaching vehicle will come within a distance threshold of the host vehicle based on second sensor data; and
actuate friction brakes in the host vehicle when a brake condition occurs, the brake condition including that the host vehicle is parked on the roadway, the person is located exterior to the host vehicle, and the approaching vehicle will come within the distance threshold of the host vehicle.

20. The computer program product of claim 19, wherein the computer readable program code is further configured to activate a brake booster coupled to the friction brakes in the host vehicle when the brake condition occurs.

* * * * *